United States Patent
Beasley et al.

(10) Patent No.: US 7,251,489 B2
(45) Date of Patent: Jul. 31, 2007

(54) WIRELESS BASE STATION NEIGHBOR DISCOVERY IN A COMMUNICATION SYSTEM, SUCH AS A SYSTEM EMPLOYING A SHORT-RANGE FREQUENCY HOPPING SCHEME

(75) Inventors: James Beasley, Simi Valley, CA (US); Dennis Dombrowski, Moorpark, CA (US); Matthew Kuiken, Thousand Oaks, CA (US); Wade Mergenthal, Camarillo, CA (US); Spencer Stephens, Los Angeles, CA (US)

(73) Assignee: Strix Systems, Inc., Calabasas, CA (US)

(*) Notice: Subject to any disclaimer, the term of this patent is extended or adjusted under 35 U.S.C. 154(b) by 468 days.

(21) Appl. No.: 10/700,788

(22) Filed: Nov. 3, 2003

(65) Prior Publication Data

US 2004/0106408 A1 Jun. 3, 2004

Related U.S. Application Data

(63) Continuation of application No. PCT/US02/13880, filed on May 2, 2002.

(60) Provisional application No. 60/288,296, filed on May 2, 2001.

(51) Int. Cl.
*H04Q 7/20* (2006.01)
(52) U.S. Cl. ...................... 455/436; 455/41.2
(58) Field of Classification Search .............. 455/41.1, 455/41.2, 436
See application file for complete search history.

(56) References Cited

U.S. PATENT DOCUMENTS 3,781,803 A 12/1973 Shear et al.

(Continued)

FOREIGN PATENT DOCUMENTS

EP 0 639 036 A2 2/1995

(Continued)

OTHER PUBLICATIONS

U.S. Appl. No. 10/052,910, filed Jan. 18, 2002, Beasley et al.

(Continued)

*Primary Examiner*—Erika A. Gary
(74) *Attorney, Agent, or Firm*—Perkins Coie LLP

(57) ABSTRACT

Disclosed embodiments include a method performed by a network access point, such as a short-range wireless communications switch or Bluetooth base station unit, to provide a neighbor list for neighboring short-range wireless communications switches or network access points in a communications network. The method includes, at the short-range wireless switch, sending at least one signal to neighboring wireless devices, wherein sending the signal is done without assistance of a mobile unit or a system controller for the communications network. The method further includes receiving a response signal from at least one neighboring short-range wireless switch, and identifying the one neighboring short-range wireless switch based on the received response signal. Additionally, the method includes providing a neighbor list that identifies the one neighboring short-range wireless switch. Numerous alternative embodiments are also described.

24 Claims, 12 Drawing Sheets

U.S. PATENT DOCUMENTS

| | | | |
|---|---|---|---|
| 5,068,916 | A | 11/1991 | Harrison et al. |
| 5,179,569 | A | 1/1993 | Sawyer |
| 5,329,635 | A | 7/1994 | Wadin et al. |
| 5,408,506 | A | 4/1995 | Mincher et al. |
| 5,495,508 | A | 2/1996 | Kaewell, Jr. et al. |
| 5,537,685 | A | 7/1996 | Matsuno |
| 5,542,098 | A | 7/1996 | Bonta |
| 5,577,025 | A | 11/1996 | Skinner et al. |
| 5,608,780 | A | 3/1997 | Gerszberg et al. |
| 5,613,211 | A | 3/1997 | Matsuno |
| 5,625,653 | A | 4/1997 | Kaewell, Jr. et al. |
| 5,794,149 | A | 8/1998 | Hoo |
| 5,818,814 | A | 10/1998 | Testani et al. |
| 5,854,981 | A | 12/1998 | Wallstedt et al. |
| 5,875,179 | A | 2/1999 | Tikalsky |
| 5,875,402 | A | 2/1999 | Yamawaki |
| 5,887,022 | A | 3/1999 | Lee et al. |
| 5,898,929 | A | 4/1999 | Haartsen |
| 5,907,807 | A | 5/1999 | Chavez, Jr. et al. |
| 5,920,549 | A | 7/1999 | Bruckert et al. |
| 5,930,297 | A | 7/1999 | Kaewell, Jr. et al. |
| 5,960,344 | A | 9/1999 | Mahany |
| 6,018,667 | A | 1/2000 | Ghosh et al. |
| 6,026,297 | A | 2/2000 | Haartsen |
| 6,046,824 | A | 4/2000 | Barak |
| 6,078,571 | A | 6/2000 | Hall |
| 6,091,936 | A | 7/2000 | Chennakeshu et al. |
| 6,097,703 | A | 8/2000 | Larsen et al. |
| 6,112,100 | A | 8/2000 | Ossoinig et al. |
| 6,119,005 | A | 9/2000 | Smolik |
| 6,119,016 | A | 9/2000 | Matusevich |
| 6,125,138 | A | 9/2000 | Kumagai |
| 6,125,280 | A | 9/2000 | Grandhi et al. |
| 6,151,502 | A | 11/2000 | Padovani et al. |
| 6,175,860 | B1 | 1/2001 | Gaucher |
| 6,178,164 | B1 | 1/2001 | Wang et al. |
| 6,185,429 | B1 | 2/2001 | Gehrke et al. |
| 6,188,904 | B1 | 2/2001 | Marsan |
| 6,192,244 | B1 | 2/2001 | Abbadessa |
| 6,195,342 | B1 | 2/2001 | Rohani |
| 6,195,551 | B1 | 2/2001 | Kim et al. |
| 6,198,920 | B1 | 3/2001 | Doviak et al. |
| 6,201,962 | B1 | 3/2001 | Sturniolo et al. |
| 6,201,969 | B1 | 3/2001 | Meier |
| 6,212,398 | B1 | 4/2001 | Roberts et al. |
| 6,219,347 | B1 | 4/2001 | Uchida et al. |
| 6,223,040 | B1 | 4/2001 | Dam |
| 6,226,515 | B1 | 5/2001 | Pauli et al. |
| 6,430,395 | B2 | 8/2002 | Arazi et al. |
| 6,675,015 | B1 * | 1/2004 | Martini et al. .............. 455/436 |
| 6,751,200 | B1 * | 6/2004 | Larsson et al. ............ 370/255 |
| 2002/0035699 | A1 | 3/2002 | Crosbie |
| 2002/0075941 | A1 | 6/2002 | Souissi et al. |
| 2002/0085719 | A1 | 7/2002 | Crosbie |
| 2002/0142721 | A1 * | 10/2002 | Souissi et al. ................ 455/41 |
| 2003/0035464 | A1 * | 2/2003 | Dehner et al. .............. 375/132 |

FOREIGN PATENT DOCUMENTS

| | | |
|---|---|---|
| EP | 1071305 A2 | 1/2001 |
| WO | WO 97/32445 A1 | 9/1997 |
| WO | WO 98/39936 A2 | 9/1998 |
| WO | WO 98/56140 A2 | 12/1998 |
| WO | WO 99/07105 A2 | 2/1999 |
| WO | WO 00/27142 A1 | 5/2000 |
| WO | WO 00/69186 A1 | 11/2000 |
| WO | WO 01/01717 A1 | 1/2001 |
| WO | WO 01/03327 A2 | 1/2001 |
| WO | WO 01/03370 A2 | 1/2001 |
| WO | WO 01/03371 A2 | 1/2001 |
| WO | WO 01/41348 A2 | 6/2001 |
| WO | WO 01/78246 A1 | 10/2001 |
| WO | WO 02/03626 A2 | 1/2002 |
| WO | WO 02/25838 A1 | 3/2002 |
| WO | WO 02/25967 A1 | 3/2002 |
| WO | WO 02/41587 A2 | 5/2002 |

OTHER PUBLICATIONS

U.S. Appl. No. 10/139,609, filed May 2, 2002, Beasley et al.

Albrecht, M. et al., "IP Services Over Bluetooth: Leading the Way to a New Mobility," Local Computer Networks LCN '99, Conference on Lowell, MA, USA Oct. 18-20, 1999, Los Alamitos, CA USA, IEEE Computer Society, pp. 2-11, XP010358529, 1999.

Arthur H.M. Ross, Ph.D., Limited, "Handoff," http://www.amug.org/~ahmrphd/Handoff.html, Jun. 28, 1996, 5 pages.

Alvarion Ltd., "Alvarion Products," http://www.alvarion.com/RunTime/Products_2000.asp?fuf=1&PrintVersion=1 (Nov.19, 2002), 1 page, Tel Aviv, Israel.

Alvarion Ltd., BreezeACCESS II Base Station Equipment, http://www.alvarion.com/RunTime/Products_2030.asp?tNodeParam=16&fuf=1&PrintVersion=1 (Nov. 19, 2002), 3 pages, Tel Aviv, Israel.

Alvarion Ltd., BreezeACCESS OFDM Base Station Equipment, http://www.alvarion.com/RunTime/Products_2030.asp?tNodeParam=37&fuf=1&PrintVersion=1 (Nov. 19, 2002), 1 page, Tel Aviv, Israel.

Alvarion Ltd., BreezeACCESS XL Base Station Equipment, http://www.alvarion.com/RunTime/Products_2030.asp?tNodeParam=17&fuf=1&PrintVersion=1 (Nov. 19, 2002), 1 page, Tel Aviv, Israel.

Alvarion Ltd., BreezeACCESS MMDS Base Station Equipment, http://www.alvarion.com/RunTime/Products_2030.asp?tNodeParam=19&fuf=1&PrintVersion=1 (Nov. 19, 2002), 2 pages, Tel Aviv, Israel.

Alvarion Ltd., "Wireless LAN," http://www.alvarion.com/RunTime/Products_2010.asp?tNodeParam=16&fuf=1&PrintVersion=1 (Nov. 13, 2002), 2 pages. Tel Aviv, Israel.

Alvarion Ltd., "BreezeNET PRO.11 Outdoor," http://www.alvarion.com/RunTime/Products_2020.asp?tNodeParam=13&fuf=1&PrintVersion=1 (Nov. 5, 2002), 2 pages, Tel Aviv, Israel.

Alvarion Ltd., "BreezeNET PRO.11 Indoor," http://www.alvarion.com/RunTime/Products_2020.asp?tNodeParam=14&fuf=1&PrintVersion=1 (Nov. 5, 2002), 2 pages, Tel Aviv, Israel.

Alvarion Ltd., "BreezeNET PRO.11 Wireless LAN. Hopping the Spectrum," http://www.alvarion.com/RunTime/Materials/PDF-Files/BreezeNet_%20PRO11.pdf (Nov. 5, 2002), 2 pages, Tel Aviv, Israel, 2001.

Alvarion, Ltd., "Secure Broadband Wireless Network With BreezeACCESS & BreezeNET PRO.11," http://www.alvarion.com/RunTime/Materials/PDFFiles/WP_BWAsecurity.pdf (Nov. 5, 2002), 6 pages, Tel Aviv, Israel, 2001.

Alvarion Ltd., "BreezeLINK" http://www.alvarion.com/RunTime/Products_2015.asp?tNodeParam=19&fuf=1&PrintVersion=1 (Nov. 5, 2002), 2 pages, Tel Aviv, Israel.

Alvarion Ltd., "BreezeLINK Full Duplex Wireless E1/T1 Modem. Extending your reach," http://www.alvarion.com/RunTime/Materials/PDFFiles/breezelink_brochure.pdf (Nov. 5, 2002), 2 pages, Tel Aviv, Israel, 2001.

Alvarion Ltd., BreezeLINK Technical Specifications, http://www.alvarion.com/RunTime/Products_2015.asp?fuf=1&type=1&type=item&htmlName=BRL_1 21_2048.htm (Nov. 5, 2002), 4 pages, Tel Aviv, Israel.

ARM Ltd., "Atmel Announces 802.11 Media Access Controller for Wireless Applications," http://www.arm.com/news.nsf/html/4MTDF9?Open Document&style=Press_Room (Nov. 4, 2002), 2 pages, San Jose, California, Mar. 22, 1999.

Baatz, S. et al., "Handoff Support for Mobility with IP over Bluetooth," Proceedings of the 25th Annual Conference on Local Computer Networks (LCN '00), pp. 143-154, Tampa, Florida, Nov. 2000.

Bluesocket Inc., "Bluesocket BluePaper," http://www.bluesocket.com/products/bluepaper.html (Nov. 20, 2002), 8 pages, Burlington, Massachusetts, 2002.

Bluesocket Inc., "Bluesocket Specifications," http://www.bluesocket.com/solutions/specs.html (Nov. 20, 2002), 3 pages, Burlington, Massachusetts, 2002.

Bluesocket Inc., "The Bluesocket Wireless Gateway Family," http://www.bluesocket.com/solutions/family.html (Nov. 20, 2002), 2 pages, Burlington, Massachusetts, 2002.

Bluetooth Specification Version 1.0B, "10. Channel Control," XP002937254, pp. 95-126, Nov. 29, 1999.

BreezeCOM Press Release, "BreezeCOM Announces Availability of MMDS Products in North America. Flexible Solution is Scalable and Easy to Install," 1 page, Atlanta, Georgia, Jun. 6, 2000.

Commil, Ltd., "Commil's Technology," http://www.commil.com/html/technology.htm (Nov. 18, 2002), 1 page, Petah Tikva, Israel.

Commil, Ltd., "Commil Ltd. Raised $7M from Leading Israeli VCs," p. 10, in "News," http://www.commil.com.html.news.htm (Nov. 18, 2002), 13 pages, Petah Tikva, Israel.

ECI Telecom Ltd., Company Profile, http://www.ecitele.com/company/company_profile.asp (Nov. 5, 2002), 2 pages.

EDN Magazine, EDN Access, "RFID tags shrink and gain flexibility," SCS Corporation, San Diego, California, p. 16, in "Hot 100 Products of 1997: North America (1-50)," http://www.e-insite.net/ednmag/archives/1997/120497/25cs-01.htm (Nov. 5, 2002), 18 pages, Cahners Publishing Company, 1997.

Haartson, J., "Bluetooth—The universal radio interface for *ad hoc*, wireless connectivity," Ericsson Review No. 3, XP-000783249, pp. 110-117, Ericsson, Stockholm, SE, 1998, no month listed.

Hlasny, D., "Synchronization of Bluetooth Access points," Version 1.0, Sharp Laboratories of America, 5 pages, Camas, Washington, Nov. 29, 2000.

Innowave ECI Wireless Systems Ltd., "About InnoWave," http://www.innowave-ws.com/asp/sub.asp?sec=3&sub=5 (Nov. 5, 2002), 2 pages, Petach Tikva, Israel, 2001.

Innowave ECI Wireless Systems Ltd., "Fixed Wireless Access—It's All We Do and We Do it All," http://www.innowave-ws.com/files/pdf/Stand%20Guide%200402.pdf (Nov. 5, 2002), 2 pages, Petach Tikva, Israel, 2001.

Innowave ECI Wireless Systems Ltd., "MultiGain Wireless (MGW)," http://www.innowave.ws.com/asp/sub.asp?sec=49&sub=312 (Nov. 5, 2002), 2 pages, Petach Tikva, Israel.

Innowave ECI Wireless Systems Ltd., "MGW, MultiGain Wireless, Wireless Voice and Data for Your Residential Users," http://www.innowave-ws.com/files/pdf/MGWbrochure.pdf (Nov. 5, 2002), 2 pages, Petach Tikva, Israel.

Innowave ECI Wireless Systems Ltd., "enhanced MultiGain Wireless (eMGW)," http://www.innowave-ws.com/asp/sub.asp?sec=49&sub=314 (Nov. 5, 2002), 2 pages, Petach Tikva, Israel.

Innowave ECI Wireless Systems Ltd., "eMGW, Your Wireless DSL Alternative for Data & Telephony Services," http://www.innowave-ws.com/files/pdf/eMGWbrochure.pdf (Nov. 5, 2002), 2 pages, Petach Tikva, Israel.

Katz, R., "CS 294-7: Cellular Telephone," CS Division, pp. 1-25, University of California, Berkeley, 1996, no month listed.

Kvaser AB, WAVEcan Product Brochure, http://www.kvaser.com/global/pdfdocs/products/wavecan.pdf, 2 pages, Mölndal, Sweden, Nov. 2001.

Li, J. et al., "Channel Carrying: A Novel Handoff Scheme for Mobile Cellular Networks," IEEE, 8 pages, 1997, no month listed.

Lucent Technologies, "AT&T and Digital Ocean to develop wireless LAN controller chip," http://www.lucent.com/press/0495/950412.nsa.html (Nov. 4, 2002), 2 pages, Utrecht, The Netherlands, Apr. 12, 1995.

Meihofer, E., "The performance of Bluetooth in a densely packed environment," Bluetooth Developers Conference, Advanced Technology & Applications Lab, Motorola, Inc., 19 pages, Dec. 4-7, 2000.

Park, V. and Corson, M.S., "Temporally-Ordered Routing Algorithm (TORA) Version 1 Functional Specification (Internet Draft)," http://www.ics.uci.edu/~atm/adhoc/paper-collection/corson-draft-ietf-manet-tora-spec-00.txt (Nov. 4, 2002), pp. 1-19., Nov. 15, 1997.

Sangal, R., "Wireless Local Area Networks," http://www.ent.ohiou.edu/~sangal/lan.html (Nov. 4, 2002), 3 pages.

Schiller, J., "Mobile Communications," pp. 84-112, Addison-Wesley, 2000, no month listed.

Toloo, M. and Mouftah, H. T., "A Combinatorial Approach to the Analysis of Channel Allocation in Personal Communication Systems," Sixth IEEE International Symposium on Personal, Indoor, and Mobile Radio Communications, pp. 572-576, Totonto, Canada, IEEE, Inc., 1995, no month listed.

Toloo, M. and Mouftah, H. T., "Analysis of the Handover Issue in Mobile Personal Communication Systems Using N-Dimensional Space," 1995 Canadian Conference on Electrical and Computer Engineering, Sep. 5-8, 1995, Montreal, Canada, "Conference Proceedings—Engineering in the Global Village," vol. 1, edited by Francois Gagnon, pp. 547-550, IEEE Inc., 1995.

Toloo, M. and Mouftah, H. T., "Speed Considerations and Handover Mechanisms in a Mobile Personal Communication System," Sixth IEEE International Symposium on Personal, Indoor, and Mobile Radio Communications, Toronto, Canada, pp. 841-845, IEEE Inc., 1995, no month listed.

Toloo, M. and Mouftah, H. T., "Traffic Characteristics Evaluation in Personal Communication Systems with Bernoulli User Sources," Chapter 89, Personal Communication Systems with Bernuolli User Sources, Parallel and Distributed Processing Techniques and Applications, pp. 857-861, Nov. 1995.

Valkó, A., "Cellular IP—A New Approach to Internet Host Mobility," ACM Computer Communication Review, vol. 29, No. 1, Jan. 1999, pp. 50-65, Association for Computing Machinery, Special Interest Group on Data Communications, http://www.acm.org/sigcomm/ccr/archive/1999/jan99/ccr-9901-valko.pdf (Nov. 18, 2002).

Wright, M., "Home-automation networks mature while the PC industry chases a new home LAN," Jun. 4, 1998, EDN Magazine, EDN Access, http://www.e-insite.net/ednmag/archives/1998/060498/12df_02.htm (Nov. 4, 2002), 8 pages, Cahners Business Information, 1998.

* cited by examiner

Figure 4 Intra-subnet Hand-off

Figure 5 Inter-subnet Hand-off

Neighbor list record

| Neighbor's Bluetooth device address ("BD Addr") | <unique 48 bit address> | 1202 |
| --- | --- | --- |
| Neighbor relationship | <1st, 2nd, 3rd tier> | 1204 |
| Initialization Time | <date, time> | 1206 |
| Rediscovery Time | <date, time> | 1208 |
| Neighbor's sync master | <predetermined BD Addr> | 1210 |
| Record Expiration | <date, time> | 1212 |

WIRELESS BASE STATION NEIGHBOR DISCOVERY IN A COMMUNICATION SYSTEM, SUCH AS A SYSTEM EMPLOYING A SHORT-RANGE FREQUENCY HOPPING SCHEME

CROSS-REFERENCE TO RELATED APPLICATION(S)

This application is a continuation of international application no. PCT/US02/13880 filed May 2, 2002, and claims the benefit of U.S. Provisional Patent Application No. 60/288,296, filed May 2, 2001, both of which are incorporated by reference.

BACKGROUND

The disclosed embodiments relate to wireless systems and networks.

Cellular mobile telephony provides voice and data links between users of mobile devices and fixed devices on a network. It gives users mobility without regard to how they are actually connected to the network. This is done by providing access points or base station units (BSU) that can hand off the connections of mobile devices without interruption of the service. 2G (second generation) digital mobile phone service and AMPS (analog mobile phone service) are examples of such telephone networks.

Many limitations exist with such telephony networks. For example, while cellular mobile telephony networks generally provide service over large areas, such networks have limited capacity for the number of user devices that can be connected within the area covered by each BSU.

The bandwidth provided to users of this service is generally considered low bandwidth or "narrow-band access." Thus, large data applications, such as transferring of large data files, cannot be effectively performed using such networks.

Providers of this service must acquire rights to use licensed radio spectra, often at high investment costs. Thus, employing such networks can be quite expensive for many applications or users.

This type of service is often unavailable or unreliable in certain areas, such as office buildings, convention centers, and train stations, due to physical properties of these areas and/or due to the density of users seeking access to the service.

The Personal Communications Network ("PCN") provides similar features to users of mobile devices, including voice and data links to a network, while providing mobility. PCN has a user model similar to that for cellular mobile telephony, so user behavior for one can be carried over to the other. PCN does not have some of the same limitations as cellular telephony. It offers wider bandwidth, or "broadband access," and can provide greater availability with higher reliability in those particular areas that cellular telephony cannot. The RF spectra used by PCN is unlicensed, and no special access rights are required.

PCN uses wireless networking technology, including IEEE 802.11, which use direct-sequence spread spectrum, and Bluetooth, which uses frequency-hopping spread spectrum. Importantly, however, the Bluetooth wireless standard does not support movement from one area of coverage or "cell" to another.

Currently, the most well-known attempt to provide features that PCN offers in a mobile environment is referred to as 3G- (third generation) wireless. 3G-wireless, however, is constrained by factors that do not constrain PCN implementations. These include heavy investment for the acquisition of spectrum usage rights.

The above wireless technologies require knowledge of which BSUs in a network have coverage overlap with other, neighboring BSUs within the network. Such overlap is a prerequisite for BSU to BSU handoff occurring without links getting dropped. Each BSU is typically given the knowledge of BSUs to which they can hand off. One example of this is the GSM system, in which each BSU is under the control of a BSU controller. See, "Mobile Communications", Jochen Schiller, pp. 84-112 (Addison-Wesley, 2000). In the GSM system, the BSU controllers and the devices that coordinate them (mobile services switching center) are what decide when and where to hand off. A network can have a potentially large number of BSUs, so it can require significant time and effort to inform each BSU about which other BSUs can receive handoffs from it.

Overall, there is a need for a wireless networking system that solves the above problems while supplying the above benefits, as well as providing other advantages.

BRIEF DESCRIPTION OF THE DRAWINGS

FIG. 12 is a data diagram illustrating a neighbor list record.

Figure 1:
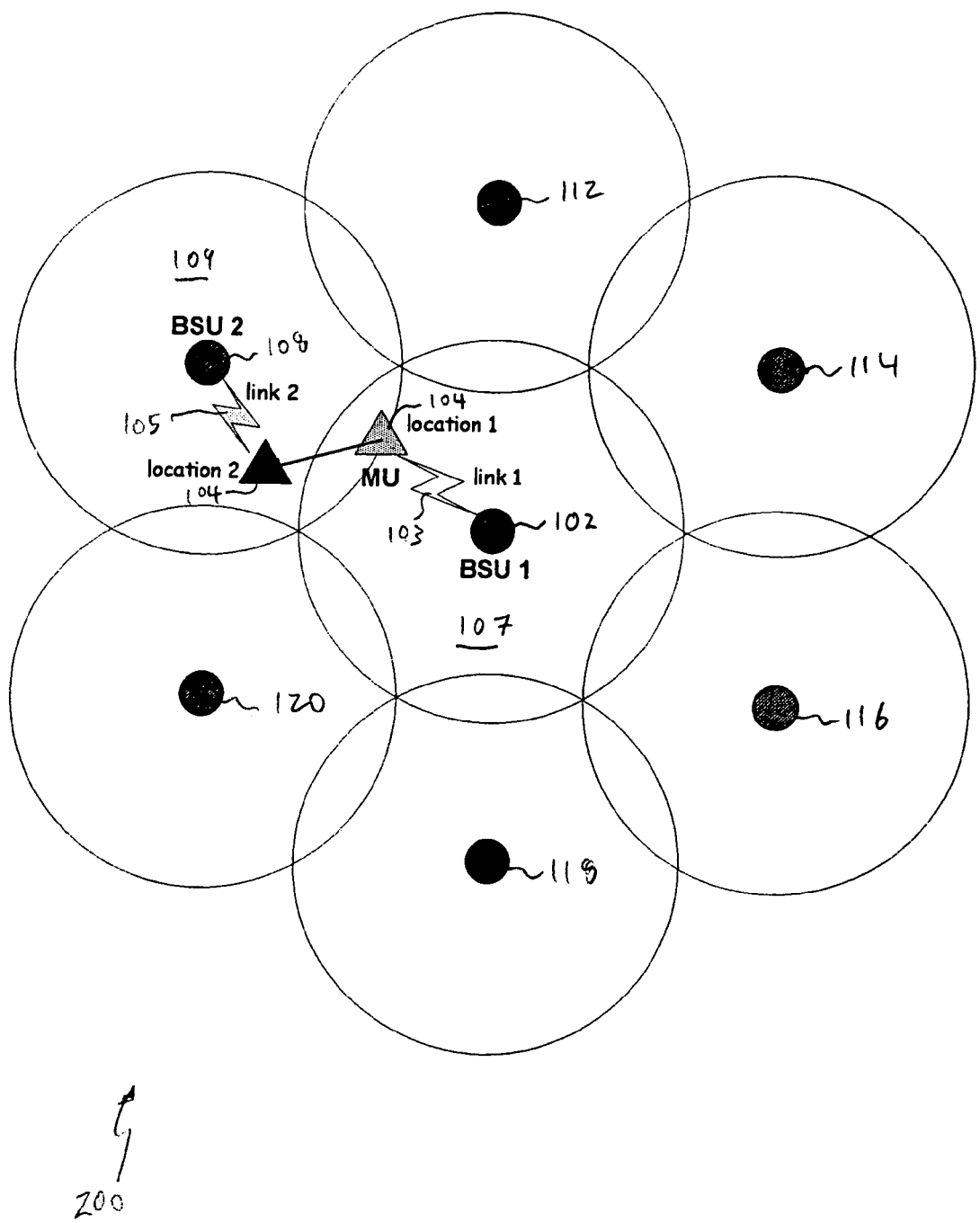
FIG. 1 is a schematic drawing showing a handoff of a mobile user device from one BSU to a neighboring BSU under one embodiment of the invention.

In the drawings, the same reference numbers identify identical or substantially similar elements or acts. To easily identify the discussion of any particular element or act, the most significant digit or digits in a reference number refer to the Figure number in which that element is first introduced (e.g., element 204 is first introduced and discussed with respect to FIG. 2).

Note: the headings provided herein are for convenience and do not necessarily affect the scope or interpretation of the invention.

DETAILED DESCRIPTION

Embodiments of the invention, described below, permit each network access point or base station unit ("BSU") within a cellular network to find out on its own which BSUs are within "handoff range." Each BSU must know this for BSU-autonomous handoff to be possible within the network (e.g., hand off without control by a system controller). Rather than incur the time and effort costs of giving each BSU the knowledge of which other BSUs to whom it may hand off, it is much more desirable to have each BSU discover, on its own, which BSUs are close enough to receive handoffs.

In one embodiment, the radio power of the BSUs is set to an operational level (e.g., a high level) such that each BSU can wirelessly detect other wireless devices or BSUs (which is not necessary for any other purpose), as well as mobile units or client wireless devices. A BSU may be able to determine, without further inquiry, whether the detected wireless device is another BSU. If this is not possible, each BSU then queries any detected device to determine whether it is a BSU. The BSU then internally stores a list of these discovered "neighbor" BSUs. For each BSU, this list identifies which other BSUs are candidates to receive handoffs during normal system operation. These candidates are referred to here as "neighbors," "neighbor base stations," or "neighbor BSUs." For the sake of clarity, the term "neighbor BSU" is defined here as: a relationship between one BSU and nearby BSUs; when a BSU is near enough to a second BSU such that a mobile unit ("MU") linked to the second BSU can be handed off to the first BSU, then the first BSU is a neighbor BSU with respect to the second BSU.

Under one embodiment described in detail below, each BSU hierarchically classifies neighbors based on the transmit power needed to locate other BSUs. Under a first alternative embodiment, a BSU discovers neighbors using a fixed transmit power level and identifies a single class of neighbors or measures other power indicators. Under a second alternative embodiment, each BSU employs a Heuristic neighbor discovery method that does not require direct BSU-to-BSU communication, but relies on the passive involvement of a mobile unit.

The inventors have found that prior systems provide for neighbor discovery. However, such prior systems generally fall into one of two groups. The first group are those systems that employ the use of a system controller, such as a mobile switching center ("MSC") to receive signals from BSUs and perform or facilitate neighbor discovery. Examples of such systems in this first group may be found in U.S. Pat. Nos. 6,125,280, 5,907,807 and 5,854,981. The second group of systems employ the use of mobile units to identify neighbors, such as mobile units operating in closed loop power control systems, where such mobile units provide received signal strength indicator ("RSSI") signals to nearby BSUs. Examples of such systems in the second group may be found, for example, in U.S. Pat. Nos. 5,680,780, 6,201,969 and 6,119,005. No prior system is believed to permit BSUs to automatically and autonomously identify neighbors by communicating with each other, and without use of a system controller or mobile units.

Described below first is a suitable system in which aspects of the invention may operate. Thereafter, details on one embodiment are provided. Finally, alternative embodiments are presented.

Aspects of the invention are described in detail below with respect to the Bluetooth specification. Bluetooth refers to a specification designed to standardize wireless transmission between a wide variety of devices, such as personal computers ("PCs"), cordless telephones, headsets, printers, personal digital assistants ("PDAs"), etc. Bluetooth acts as a "virtual cable," whereby a computer can automatically use a mobile telecommunications device (such as a cell phone) to send data wirelessly, such as exchange e-mail, transmit data to a fax machine, etc. Bluetooth operates in the unlicensed 2.4 GHz spectrum using frequency-hopping spread spectrum, where data packets are spread across the Bluetooth spectrum at a nominal rate of 1,600 hops per second to lessen interference and fading. According to the Bluetooth specification, Bluetooth devices operate their antennas at one of three different maximum antenna power levels, i.e., 1 mW, 2.5 mW and 100 mW. The nominal link range is 10 meters, and the gross data rate is 1 Mbps, although increases may be possible. Bluetooth can support both synchronous connection oriented ("SCO") links for voice and asynchronous connectionless ("ACL") links for packet data. Details on Bluetooth may be found at http://www.bluetooth.com, "Bluetooth Revealed," Miller & Bisdikian, Prentice Hall PTR, 2001, and "Bluetooth Demystified," Muller, McGraw-Hill, 2001, and in particular, "Specification of the Bluetooth System," version 1.1: httf://www.bluetooth.com/developer/specification/specification.asp.

The following description provides specific details for a thorough understanding of, and enabling description for, embodiments of the invention. However, one skilled in the art will understand that the invention may be practiced without many of these details. In other instances, well-known structures and functions have not been shown or described in detail to avoid unnecessarily obscuring the description of the embodiments of the invention.

As introduced above, the Bluetooth specification defines a protocol for device-to-device and device-to-network communication in a small area. The size of the area is determined by the maximum range over which these devices can communicate and is a function of their radio performance. Communication is not possible if an MU is located outside the maximum range. When such devices communicate, they first establish a link and then maintain that link for the duration of their communication. If the link is interrupted for any reason, then communication is also interrupted.

FIG. 1 shows a device-to-network link 103 shown as "link 1." Here, an MU, or mobile unit 104, represents the wireless mobile device. An access point picocellular system node, shown as a stationary BSU, or base station unit 102, provides an interface to a network (not shown in FIG. 1). The terms "mobile unit" and "MU" are used interchangeably herein, as are "base station unit" and "BSU." A picocellular system node typically refers to a wireless base station with extremely low power designed to cover an extremely small area, such as one floor of an office building. Indeed, short range wireless communication as described herein generally refers to an effective range of 500 meters or less (and with Bluetooth, often less than 100 meters), although some systems may reach up to 1 kilometer depending upon the wireless transmission protocol and power level. Base station units described herein are generally fixed relative to a given location. The location may be any stationary building or geographic space (such as a parking lot or park). Alternatively, the BSU may be fixed relative to a movable object such as a vehicle (e.g., train, ship or plane).

A large circle 107 represents the maximum range of communication between these two devices at a given transmission power class—the "domain" of the BSU. While the maximum range limits the coverage of a single BSU, a Pocket Mobility Network ("PMN") system employs multiple distributed BSUs to cover a large region. In general, a cellular communications network typically consists of a collection of BSUs, where the BSUs provide wireless access points for mobile users to obtain a communication link to a wide range of information and communication services. An important feature of a cellular communications network is that mobile units can "roam" from one BSU to another within the system and not experience any disruption of the communication link while doing this. When a mobile user roams from one BSU to another, a procedure called "handoff" is performed, where the link is actually transferred from the currently connected BSU to a neighboring BSU. To ensure the best performance, the handoff process is desired to be as fast and efficient as possible. In addition, data throughput is desired to be as high as possible.

In FIG. 1, a collection of fixed access points, or BSUs 102, 108 and 112-120, are all able to establish a link with the MU 104 and, when it is within their range, provide access to the network. The large circles around each BSU illustrate the operating coverage or domain of each BSU (e.g., circles 107 and 109 are associated with BSU's 102 and 108, respectively). Typical BSU placement allows for overlapping areas of coverage. The BSU that actually participates in a link is generally the one that has the strongest signal at the MU (but other factors may affect this, as well). When that signal weakens, a handoff may occur. A handoff of the link may be made from the BSU 102 to the neighbor BSU 108, creating a new link 105 (link 2).

When the MU 104 first establishes a link with a BSU, it does so using the same procedures that it might use to communicate with any other Bluetooth device. To the MU, the BSU behaves exactly like any other Bluetooth device that operates in conformance with the Bluetooth specification. Thus, it does so while not requiring any modification to MU devices that comply with the Bluetooth specification. In the example of FIG. 1, after establishing link 1, the MU 104 can continue to communicate with the network through the BSU 102 for as long as necessary, as long as it stays within the domain of the BSU. While aspects of the invention are described herein as employing the Bluetooth protocol, those skilled in the relevant art will recognize that aspects of the invention are equally applicable with other communication protocols and standards, including IEEE 802.11, Home RF, etc.

When the MU 104 moves, it may move within the range of another BSU (e.g. shown in FIG. 1 as the MU moving from location 1 near the first BSU. 102 to location 2 near the neighbor BSU 108, where the MU establishes a new link with the neighbor BSU 108). If the MU moves beyond the range of the first BSU 102, the link with the neighbor BSU 108 can be used to maintain uninterrupted communication with the network, provided that a new link is established before the link with the first BSU is lost. In other words, the MU 104 must establish a link 2 with the BSU 108 in a new domain 109.

Under one embodiment, the PMN is designed in a fashion similar to the General Packet Radio Service ("GPRS") system architecture and thus, may use much of the same terminology. The PMN includes multiple BSUs (or alternatively, a BSU with multiple base transmitter stations and a BSU controller) and a PMN system controller ("PSC") to manage the BSUs. A backbone controller to link the BSUs and controller with RF or other wireless links, instead of cabling, may be employed. A network service provider may supply various devices to provide connectivity to networks beyond the immediate premises (or other coverage area) as part of a complete service.

Each BSU includes at least a Bluetooth RF module, a general purpose microprocessor (BaseBand controller) with memory (e.g., RAM) and an antenna. The BSUs may mount on a ceiling and provide radio coverage within an approximate 10-meter radius. Each BSU may run Asynchronous Connectionless Links ("ACL") and/or Synchronous Connection Oriented ("SCO") services for data and voice connectivity and a control stack, and a voice-over IP software module. Each BSU is based on available Bluetooth chip modules and available Bluetooth protocol stacks.

The BSUs may each be directly connected to the PMN by using appropriate cabling, such as Category 5 cabling. Such cabling is necessary to provide not only a signal path therebetween, but may also supply power to the BSU. Alternatively, a link with the BSU controller may be accomplished via wireless techniques. Wiring may be required, however, to provide power to the BSUs.

The PSC may include multiple interfaces (such as Ethernet interfaces), a processor module, a switching module, and interfaces for channelized voice and LAN/WAN or other connectivity (including packetized voice). The PSC software modules may include a voice stack, a data stack, and a control stack. The control stack handles mobile unit tracking and handoffs, user management, and session management.

A network service provider providing the PMN may also include a channelized (standard) private branch exchange ("PBX"), a voice over IP PBX switch, a direct connection to the public switched telephone network ("PSTN"), a router (for data, voice over IP, or both), a server (for providing various application), a cache, etc. Prepackaged applications for vertical markets, such as hospitals, theme parks, malls, airports, for enterprises and service providers, for private networks in a public space, etc., may also be provided with the PMN.

Figure 2:
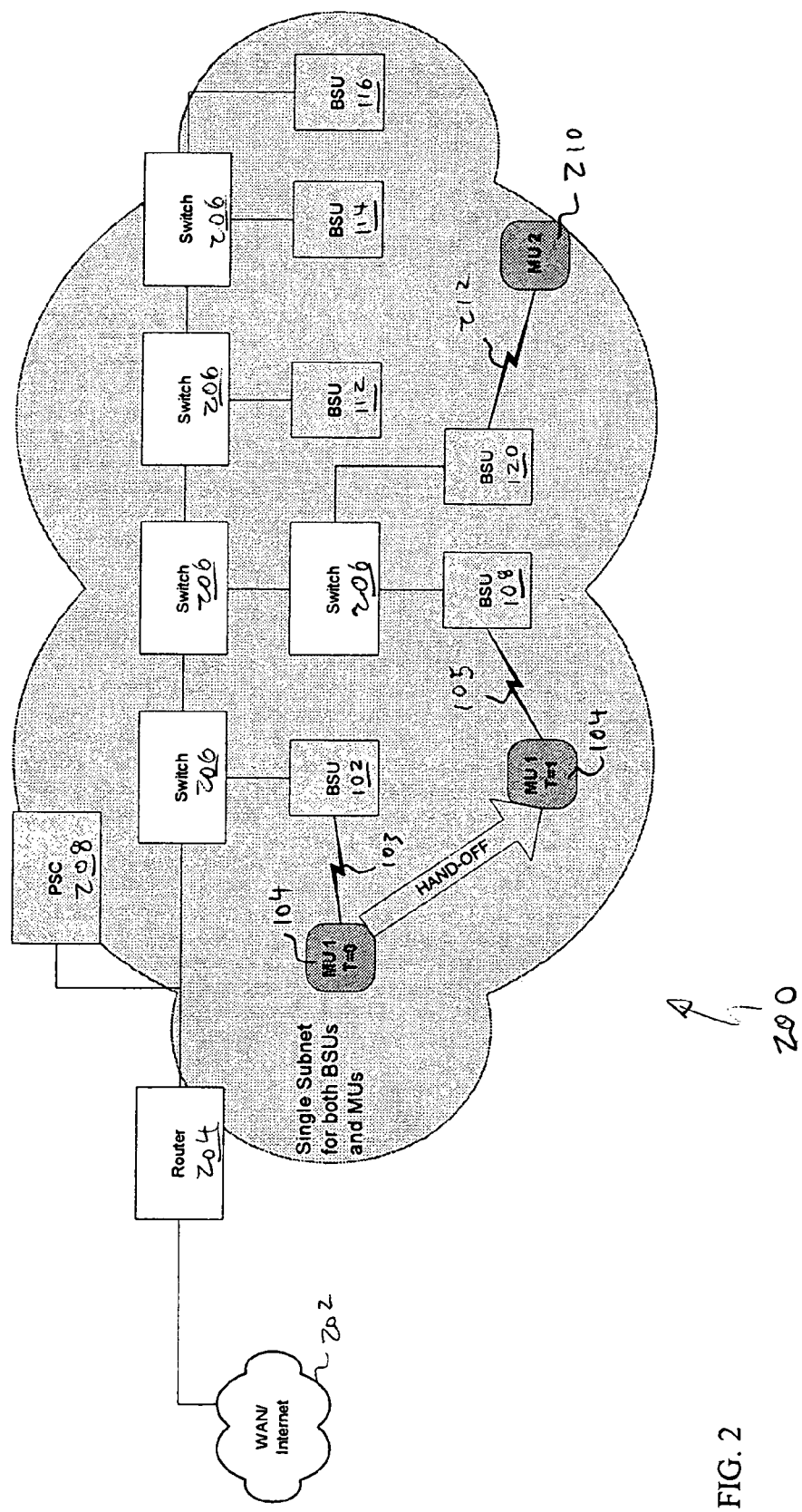
FIG. 2 is a block diagram illustrating a single Internet Protocol (IP) subnet architecture. All BSUs and mobile units are assigned addresses within this single subnet.

An example of a PMN is shown in FIG. 2. Referring to FIG. 2, the BSUs are coupled to the Internet or wide area network ("WAN") 202 by way of an edge router 204 and switches 206. As shown in FIG. 2, each BSU is coupled to one switch. Each BSU acts as a bridge between a wired LAN that includes the BSUs, switches 206 and router 204, and the wireless links to the mobile units (e.g., wireless links 103 and 212 to mobile units 104 and 210). The LAN is implemented using Ethernet or an appropriate alternative technology. A PMN system controller ("PSC") 208 or "system controller" is coupled to the network 200 or subnet and acts as a systems data communication gateway providing mediation between the PMN and the Internet or WAN 202. While the Internet or WAN 202 are shown, the subnet may be coupled with other networks, such as a LAN, the PSTN, or public land mobile network ("PLMN"). The PSC switches voice and data communications to the appropriate wired or wireless network to which the subnet is coupled.

The PSC and BSUs may employ the Bluetooth LAN access profile ("LAP"). The LAP uses established networking protocols to enable a computing device or MU to obtain access to a data network. Use of the LAP is comparable to directly connecting to a data network such as via Ethernet. Further details regarding LAP may be found in the Bluetooth protocol noted above.

The network 200 forms the entire domain of the PMN, which is the domain over which a mobile unit can be handed off. If a mobile unit can be handed off between BSUs, then those BSUs are on the same PMN. The router 204 that connects the PMN or subnet both logically and physically to the rest of a corporate network (e.g., WAN 202) is the first router of in the data path for MUs communicating with nodes outside of the subnet and may be running network address translation ("NAT").

NAT refers to an Internet standard that enables a local area network to use one set of IP addresses for Intranet traffic and a second set of addresses for external traffic. This allows a company to shield internal addresses from the public Internet. This would allow the network 200 to connect to the Internet 202 while not all hosts within the network have globally unique (also known as public) IP addresses. Thus, NAT enables the network 200 to use private IP addresses to connect to the Internet. The NAT-enabled router translates internal local addresses to globally unique IP addresses before sending packets outside of the network 200. Many ways of implementing NAT exist.

Most models of cellular-like systems from General Packet Radio Service ("GPRS") use a non-routed Radio Access Network ("RAN"). In other words, the IP address of the mobile unit is not used to locate the mobile unit once the packet is inside a gateway router. In GPRS, the serving GPRS support node ("SGSN") maintains a mapping of IP addresses to telephone numbers to keep track of locations of mobile units by telephone numbers. As a mobile unit is handed off from one BSC to another, the SGSN tables are updated.

Figure 3:
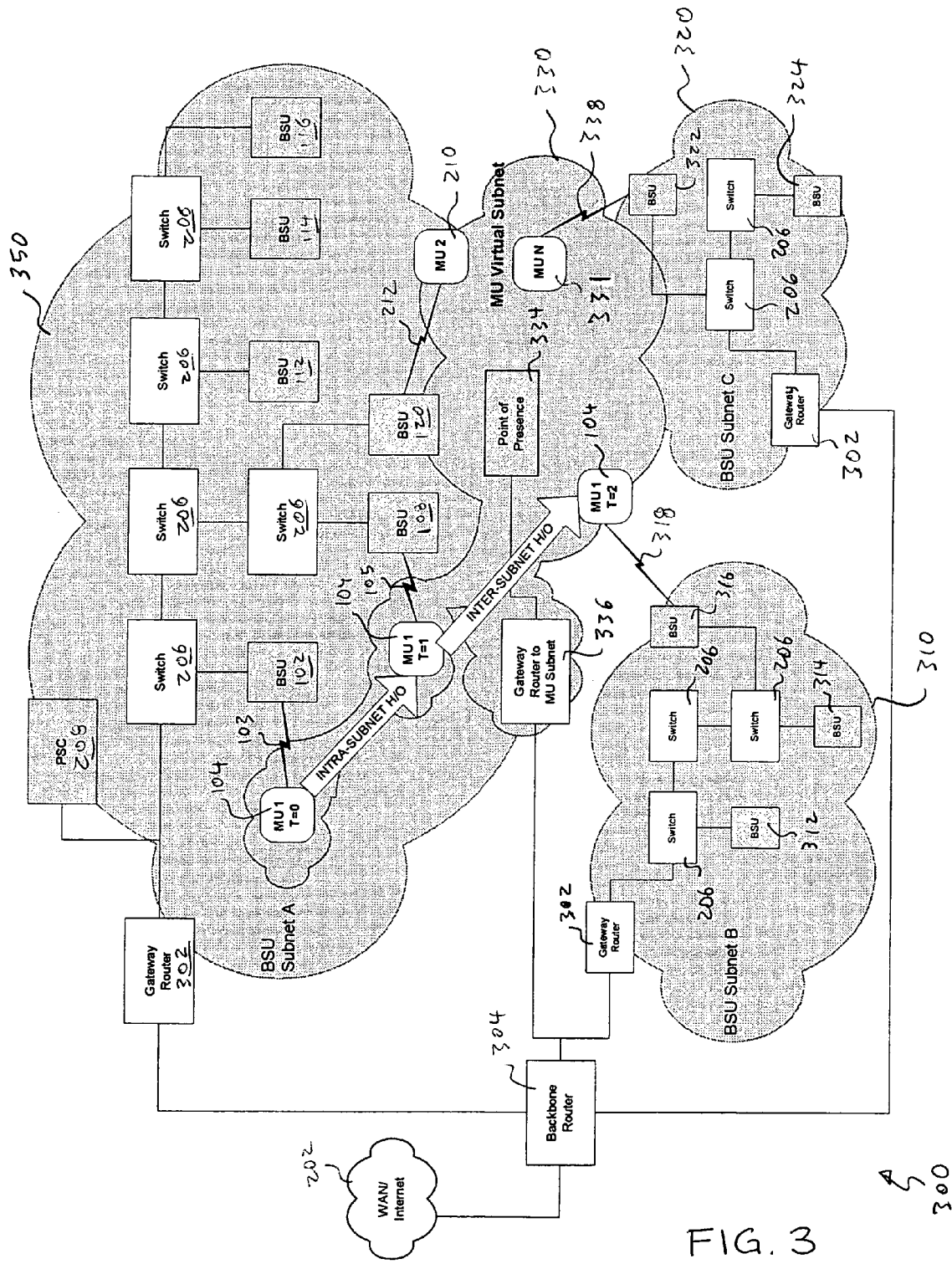
FIG. 3 is a block diagram of a multiple subnet architecture where BSUs and mobile units are assigned addresses that fall within multiple IP subnets. In this embodiment the mobile units belong to a separate subnet dedicated to the MUs and their point of presence [330].

The pocket mobility network described in FIG. 3 (the multiple subnet architecture) follows a model similar to GPRS. A simplifying factor is that the PMN uses Ethernet within a network or subnet. Once a node (e.g., BSU) makes itself known to the network (described below), the switches and routers 206 that comprise the subnet will keep track of the correct routing for packets addressed to that node. Another simplifying factor is that the FIG. 3 (the multiple subnet architecture) PMN is a fully-routed network.

Multiple subnets may be interconnected to create a larger installation where BSUs and MUs are assigned IP addresses that fall within multiple subnets. As shown in FIG. 3, a network 300 includes consists of three physical subnets 350, 310 and 320, and a MU virtual subnet 330 that includes an MU 331 and the MU 104. As shown, all three subnets 350, 310 and 320 are similar to the previously described network 200 except that none of them contain the subnet to which the MUs belong: the first subnet 350 includes the BSUs 102, 108, 120, 112, 114 and 116 coupled to switches 206 which in turn are coupled to the a gateway router 302, the second subnet 310 includes BSUs 312, 314, and 316 coupled to switches 206, which in turn are coupled to a gateway router 302, while the third subnet 320 includes BSUs 322 and 324 coupled to another gateway router by way of switches 206. Between subnets, packet traffic passes through the gateway routers 302 to gain access to a backbone, which can be a backbone router 304. The gateway routers 302 are typically edge routers and may be running, for example, NAT. Alternatively, NAT may be run on the backbone router 304.

Figure 4:
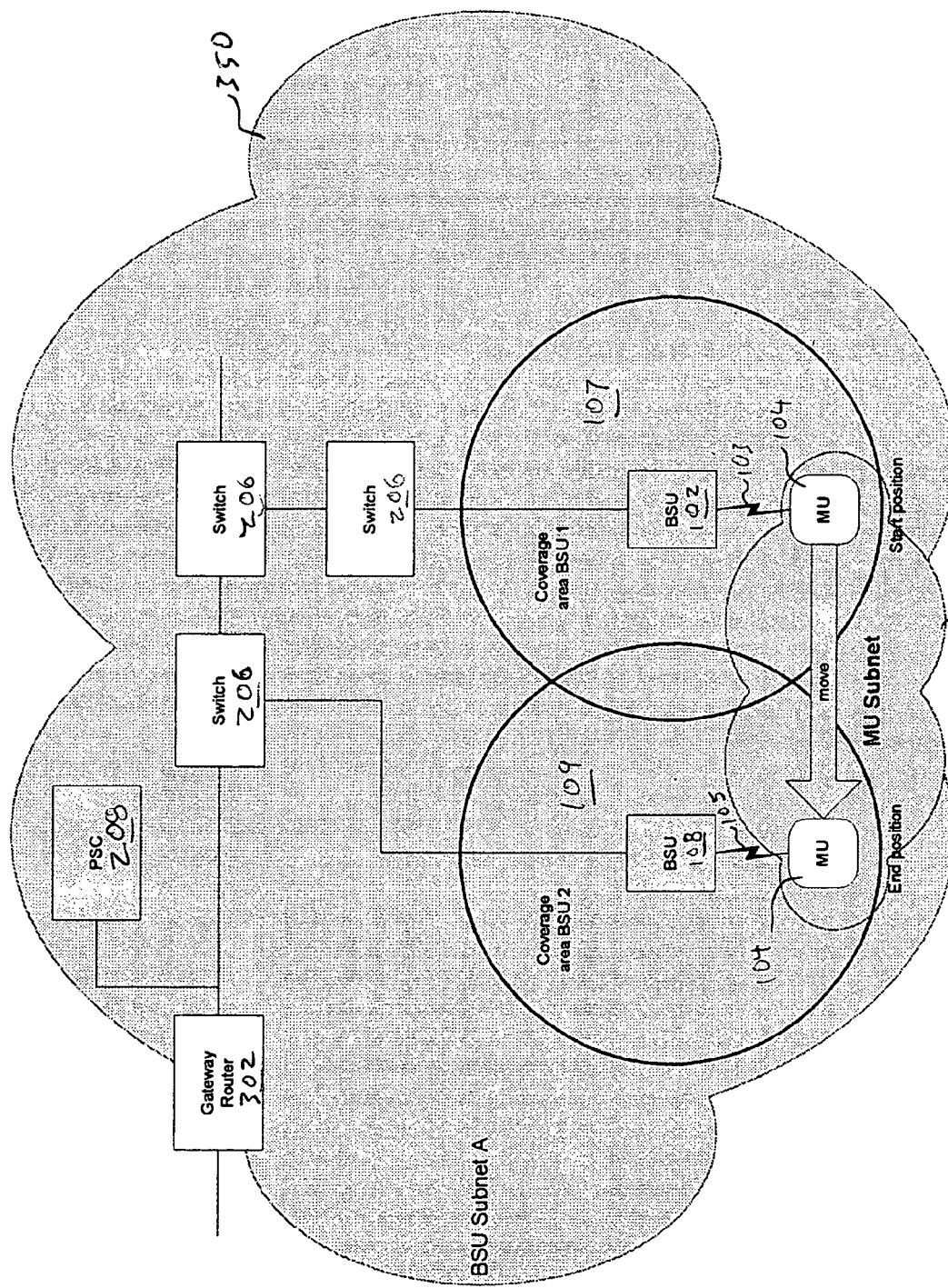
FIG. 4 is a block diagram illustrating an intra-subnet handoff from one BSU to another under the network of FIG. 3.

FIG. 3 illustrates both intrasubnet and intersubnet handoffs within the multiple subnet architecture. An intrasubnet handoff, such as between BSUs 102 and 108, is shown in more detail in FIG. 4. Such an intrasubnet handoff is similar to that described above with respect to FIG. 1 and is defined as a handoff where the initial or owner BSU and neighbor or target BSU are on the same subnet.

Figure 5:
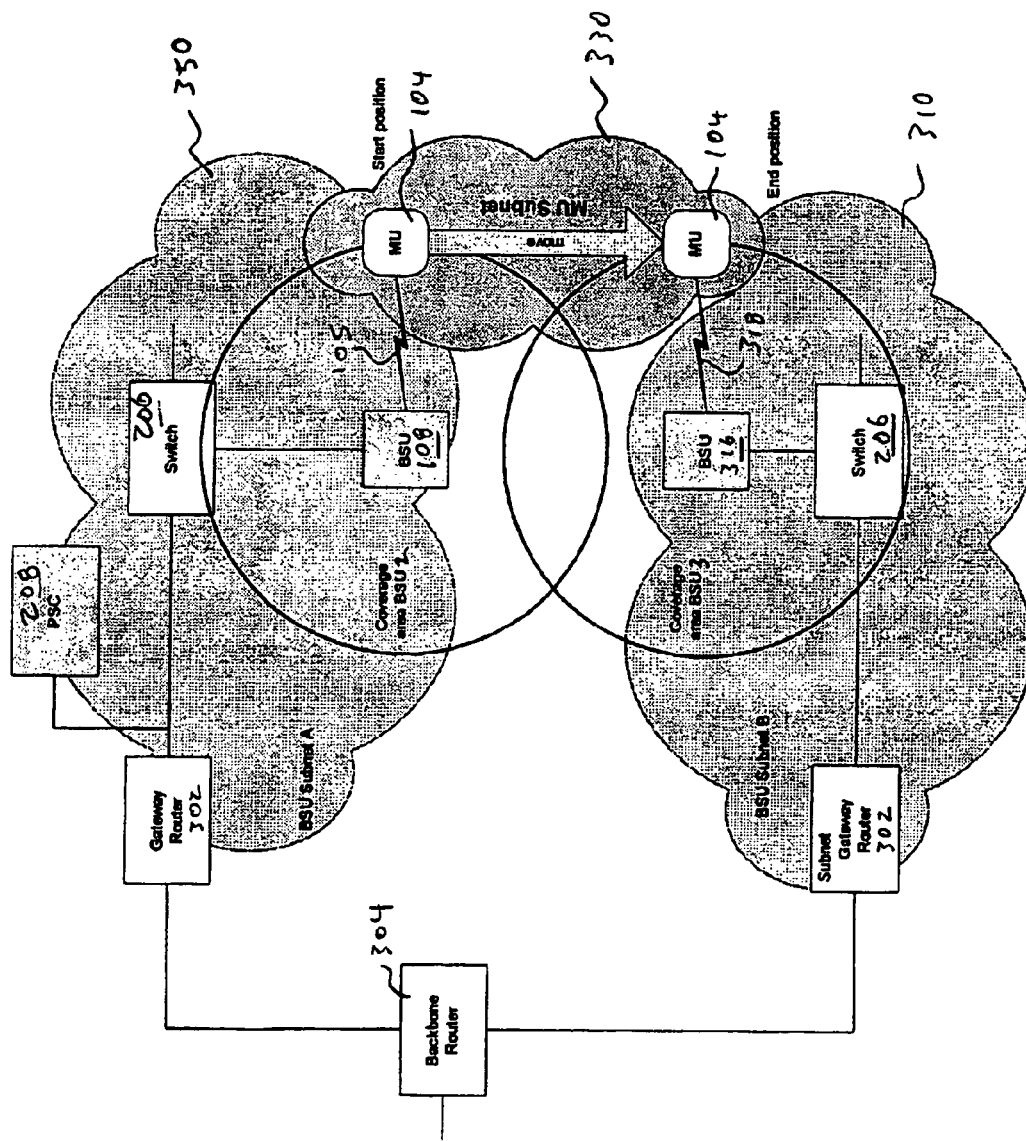
FIG. 5 is a block diagram illustrating an inter-subnet handoff of a mobile unit from a BSU in one subnet to a BSU in another subnet under the network of FIG. 3

Alternatively, and shown in greater detail in FIG. 5, an intersubnet handoff is defined as a handoff where the initial and target BSU are on different subnets, such as the BSU 108 associated with the first subnet 350 and the BSU 316 associated with the second subnet 310. The mobile unit 104 moves from the domain of the BSU 108 to the domain of the BSU 316. The wireless link 105 with the BSU 108 is dropped in favor of a new wireless link 318 established with the BSU 316.

The multiple subnet architecture ("MSA") shown in FIG. 5 forms a virtual subnet for the mobile units and set of BSUs together with a point of presence 334 (shown in FIG. 3). The point of presence 334 is defined to be the device on the MU virtual subnet 330 that is physically attached to the wired LAN or network (coupled to the backbone router 304 by way of a gateway router 336). The MU subnet 330 is a real subnet in a logical sense, and is logically attached to each of the BSU subnets 350, 310 and 320 by way of the point of presence 334.

Figure 6:
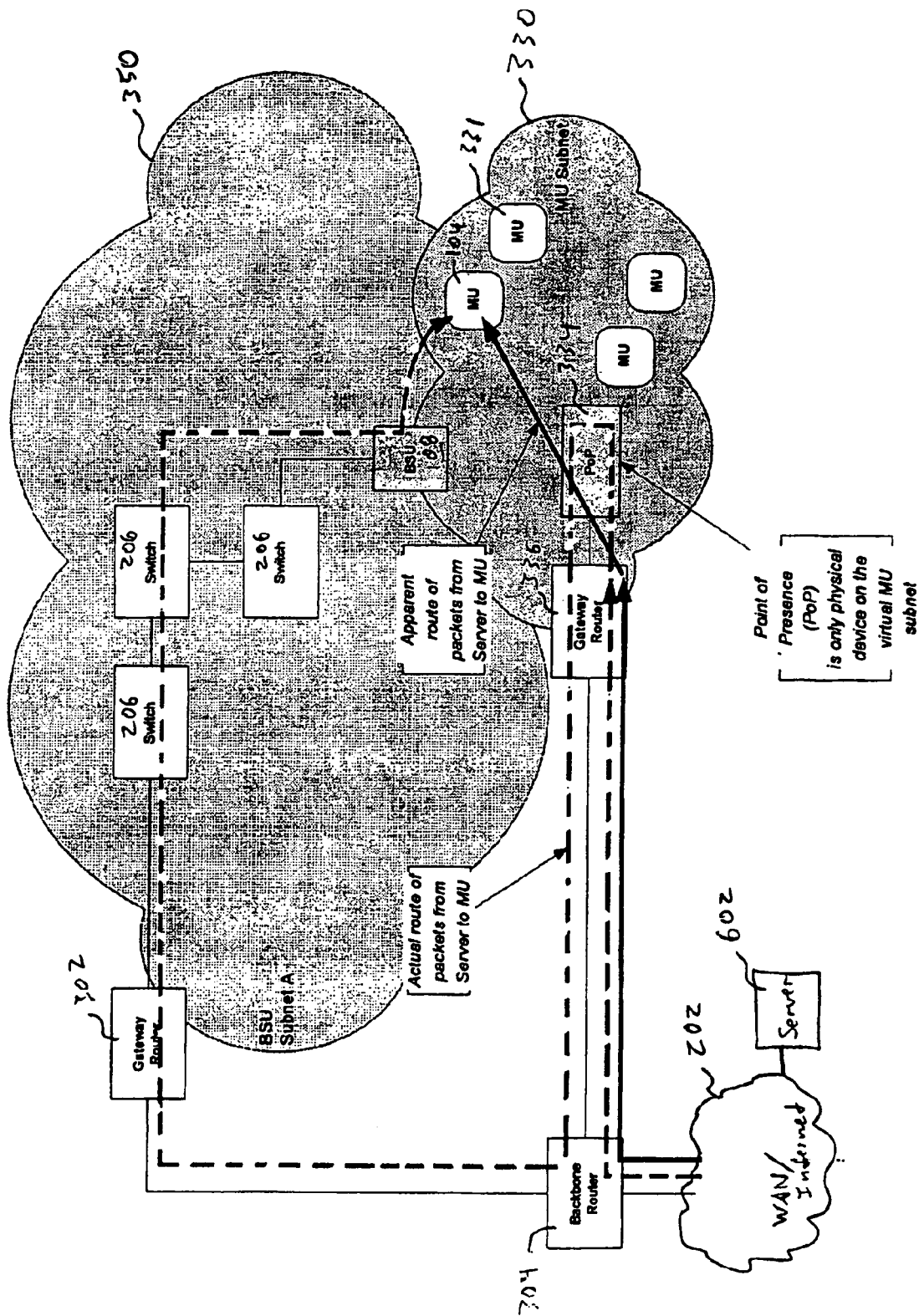
FIG. 6 is a block diagram showing logical and actual routes of packets from a host or server to a mobile unit under the network of FIG. 3.

FIG. 6 shows how the gateway router 336 provides access to the MU subnet 330 and the point of presence 334. The gateway router 336 may be a separate device, or it may be combined with the point of presence 334. The logical route for packets from a host or server 602 to, for example, the MU 104 is over the wired LAN or backbone network to the point of presence 334 and directly to the MU (as shown as the solid arrows in FIG. 6). The actual route of packets is not directly from the point of presence to the MU but back through the gateway router 336, backbone router 304, gateway router 302 associated with the subnet 350, through switches 206 and to the BSU 108, all over the backbone network. IP mobility, such as can be provided via a tunneling protocol, provides communication between the point of presence 334 and the appropriate BSU 108. The point of presence 334 may be part of the PSC 208, or it could be distributed across one or more BSUs. The point of presence and PSC are shown as two separate entities in FIG. 3 because they are logically separate. They may be implemented, however, as separate blocks of code on a single server (e.g., a single Linux server).

Details regarding how one BSU identifies others will now be described. Characteristics of the Bluetooth RF environment and protocol include three possible power classes (0 dBm, 4 dBm, 20 dBm), resulting in radio ranges from about 10 meters to about 100 meters. During normal system operation, BSUs communicate with each other over the backend wired network described above.

Knowledge about neighbors may first be learned at system startup. Each BSU is equipped with a Bluetooth radio that can communicate with neighboring BSUs. During network (and BSU) startup and at subsequent regular intervals, the BSUs find and record their neighboring BSUs using the following method.

Figure 7:
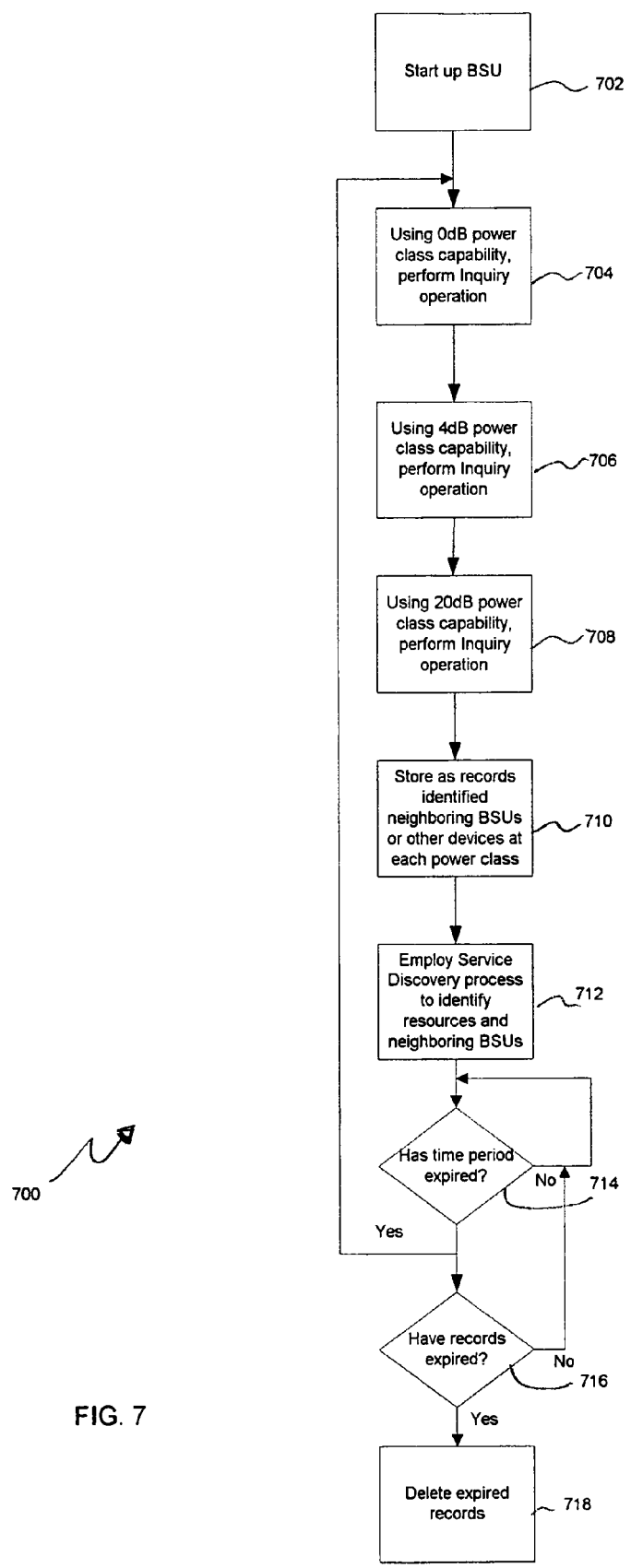
FIG. 7 is a flow diagram illustrating overall functionality performed under a neighbor discovery process.

Referring to FIG. 7, a routine 700 for identifying and recording neighboring BSUs is shown. Unless described otherwise herein, the functions in the blocks depicted in FIG. 7 are well-known or described in detail in the above-noted and cross-referenced provisional patent application. Indeed, much of the detailed description provided herein is explicitly disclosed in the provisional patent application; most or all of the additional material of aspects of the invention will be recognized by those skilled in the relevant art as being inherent in the detailed description provided in such provisional patent application, or well-known to those skilled in the relevant art.

The routine 700 begins in block 702 where one or more BSUs are initialized. In block 704, using the 0 dBm power class capability, each BSU performs a Bluetooth inquiry operation (defined under the protocol) to find any BSUs within about 10 meters. Numerous BSUs may be identified within 10 meters in high density installations. Under the inquiry operation of the Bluetooth protocol, each BSU "searches" for other devices in its vicinity. Inquired devices execute inquiry scans. During inquiry operation, an "inquiry address" is used (the general inquiry access code ("GIAC") is "0x9E8B33" for the GIAC LAP), and no Bluetooth device may have an address whose LAP coincides with the GIAC LAP. There are 63 inquiry access codes ("IAC") (excluding the GIAC). The IACs may be used as a filtering mechanism for identifying well-defined subsets of devices that may receive inquiries, such as the BSUs described herein.

In block 706, each BSU uses the 4 dBm power class capability and performs an inquiry operation to find any BSUs within about 20 meters. Thereafter, in block 708, each BSU uses the 20 dBm power class capability (if present) to identify any BSUs within about 100 meters. In block 710, each BSU locally stores as records all identified neighboring BSUs (or other devices) at each power class. Thus, each BSU contains a tiered list or quantization of neighboring BSUs. Such a quantization of BSUs provides greater handoff flexibility. For example, it may be more desirable not to hand off an MU traveling at high velocity to a nearby BSU, but rather to a more distant BSU which will be able to keep that MU longer before requiring another handoff.

A BSU may discover not only its neighboring BSUs, but also some non BSU devices. Thus, after each BSU detects a device, the BSU queries it under block 712. For example, each BSU employs the service discovery protocol ("SDP") under Bluetooth to determine whether it is a BSU. The SDP defines a standard method for Bluetooth devices to discover and learn about services offered by other devices. Additionally, the SDP defines a way for devices to describe those services offered to other devices. The BSU may then modify the stored records to flag or distinguish neighboring BSUs from other devices. The stored hierarchical list of BSU neighbors is kept in persistent memory (disk file, flash memory, and RAM are some options).

The stored records must be updated to ensure that the list of neighboring BSUs is accurate. The validity period of these records is unpredictable and could be for the duration of the PMN power-on time. However, there are a number of reasons that a given BSU's neighbor list may need to change during normal PMN operation: a BSU may go down; a downed BSU may come back up; or the RF environment may change such that one or more BSUs suddenly can no longer "hear" each other—for example, addition of a wall, partition, interfering equipment, etc.

Thus, once a network has been operating for some period of time and neighbor discovery has, occurred in the manner described, additional BSUs may come online that would need to become integrated into the network. Similarly, BSUs may go offline and their resources would become unavailable to the network for some period of time. To handle new BSUs that come online and to have offline BSUs' absences detected and their resources recognized as unavailable, each BSU's list of neighbors must be kept current.

To address these concerns, the neighbor list record (and all other records kept within the BSU) contains an indication of the maximum persistence period for that particular record which must be refreshed once the persistence time lapses. Thus, under block 714, each BSU determines whether the persistence time period has expired. If not, the record is valid, and the routine loops back to wait a predetermined time before again checking whether the persistence time value has expired. Once the persistence time period has expired, the routine loops back so that the particular BSU having an expired record again performs blocks 704 through 712 to identify and record neighboring BSUs.

Each record for neighboring BSUs has associated with it a persistence period. Under block 716, each BSU periodically (or as needed) refers to its stored records to determine which records have expired and, under block 718, deletes expired records. Alternatively, the BSU may update each record to reflect that the BSU (or other device) associated with that record is no longer available.

Under an alternative embodiment, rather than associating a persistence period with each record, all records are periodically refreshed and each BSU stores only a master persistence period. When the master persistence period expires under block 714, blocks 704 through 712 are again performed. Thus, each BSU maintains a refreshed set of records, and all old records are overwritten under block 710. (Blocks 716 and 718 not performed under this alternative.)

Figure 8:
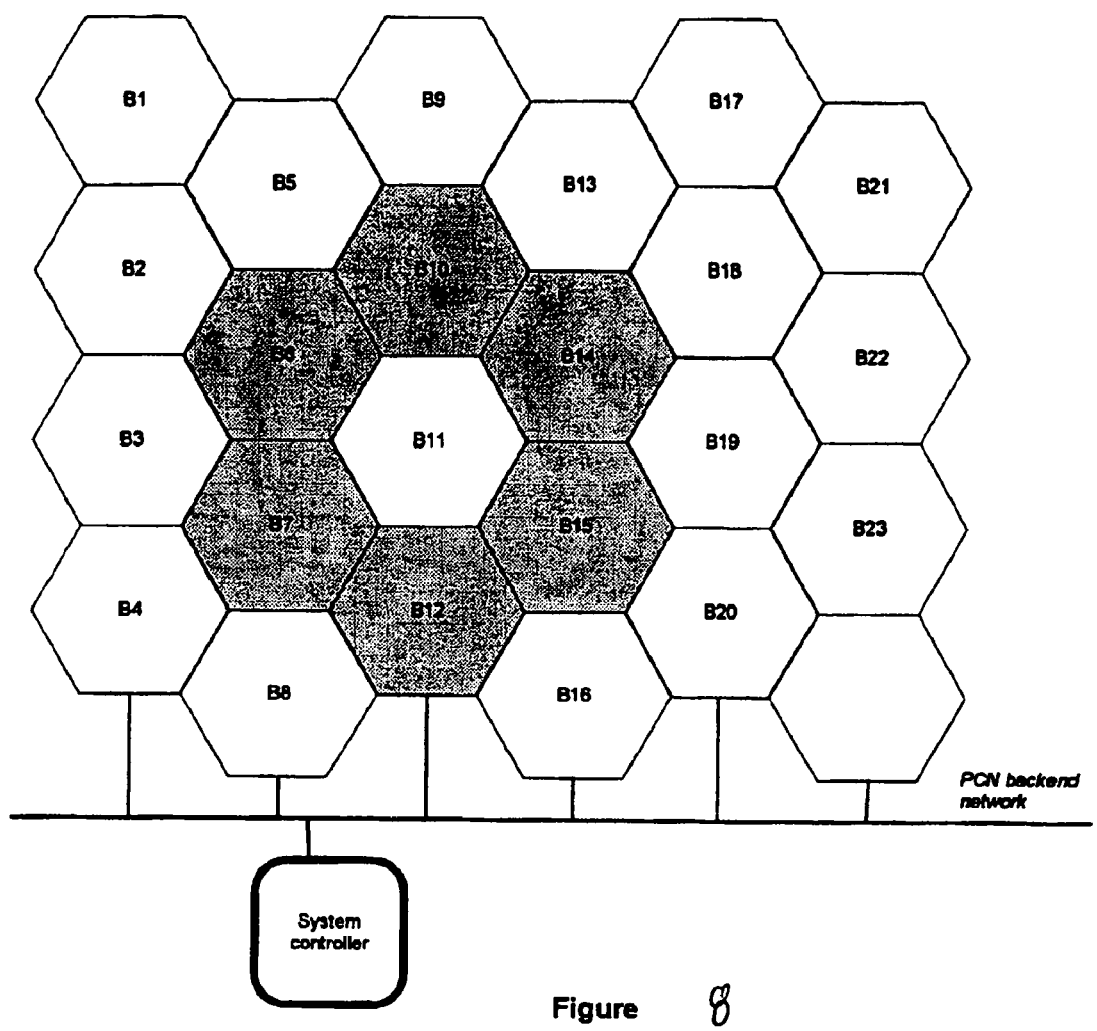
FIG. 8 is a schematic diagram illustrating neighbor discovery in a first tier discovery method under an embodiment of the invention.
Figure 9:
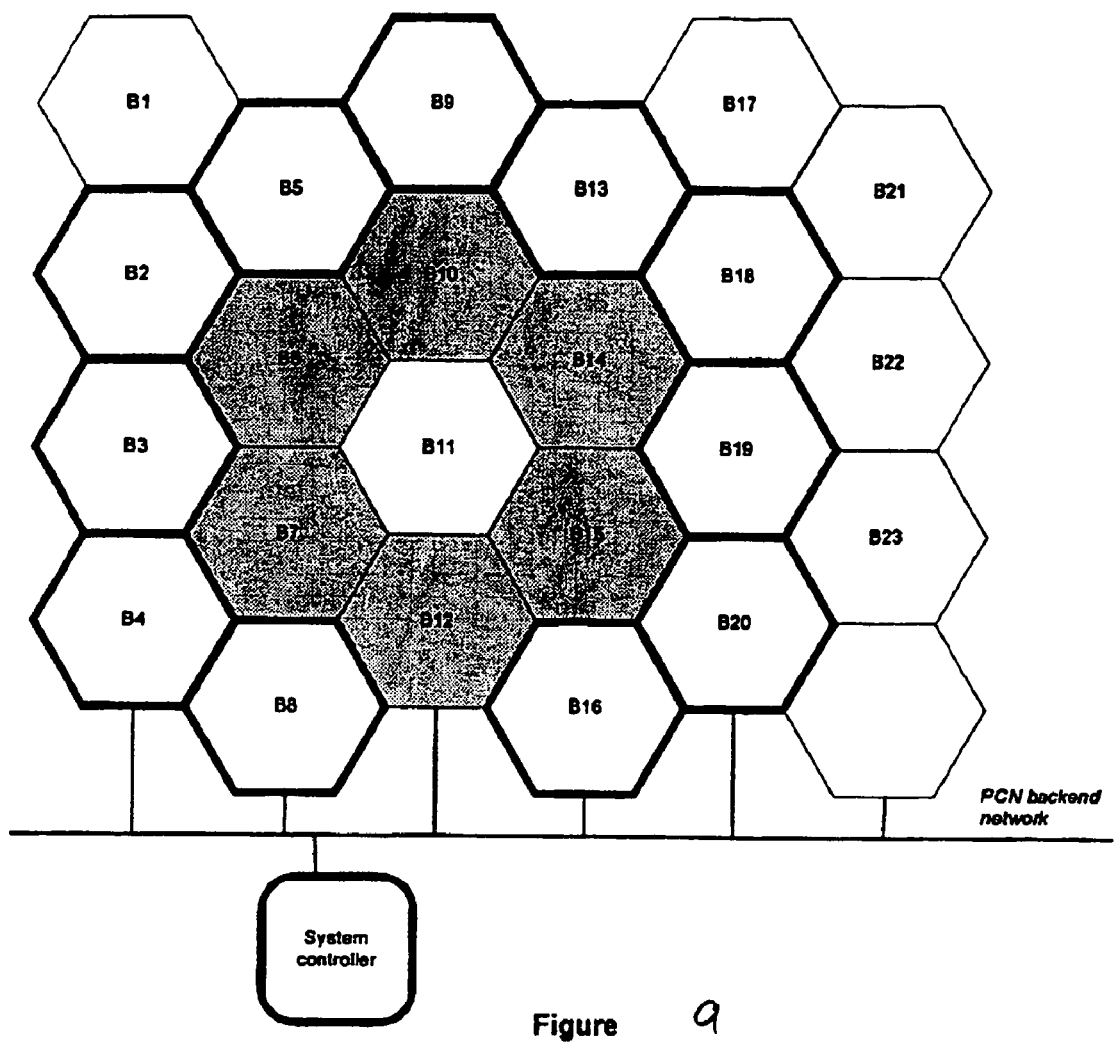
FIG. 9 is a schematic diagram illustrating neighbor discovery in a second tier.

An example of how a BSU identifies neighbors within at least two tiers will be described with respect to FIGS. 8 and 9. For illustrative purposes, FIGS. 8 and 9 show a PMN with BSUs installed in a flat space, such as a single story building. Other installations may have BSUs placed in three dimensions. In the example shown, a BSU B11 under block 704 would discover neighbor BSUs B10, B6, B7, B12, B15, and B14. These nearest neighbors would be classified as "first tier."

At the intermediate power, the BSU B11 under block 706 additionally would discover BSUs B9, B5, B2, B3, B4, B8, B16, B20, B19, B18, and B13. These would be classified as "second tier" neighbors based on their presumed greater distance from the discovering BSU. This is illustrated in FIG. 9. They may not in fact all be at a greater distance—RF environment factors could, for example, be attenuating the wireless signal. For whatever physical reason, BSUs that are not detected under block 704 but are detected under block 706 are termed "second tier." Additional neighbors, may be discovered under block 708. The hierarchy of tiers may of course be expanded to additional tiers (beyond 3).

Note: the use of hexagons to represent BSU cells in FIGS. 8 and 9 is for clarity only, to avoid the clutter of overlapping circles. There is no implication that, in a PMN installation, a given BSU will always have six or less neighbors. In fact, there will most likely be installations where cells are placed such that BSUs have more extensive overlap, and a given BSU may indeed have more than six neighbors. If the PMN installation is in a multistory facility, with BSUs on adjacent floors, BSUs may also be discovered several floors above and below. These are important so that a user walking up or down a stairway can still experience handoff. There is no limit to the number of neighbors that a BSU may have.

In one embodiment, each BSU employs various layers of software under the Bluetooth protocol. Each BSU may thus further include radio environment monitoring ("REMon") and radio environment management ("REMan") software, which includes a REMan component that operates above the host controller interface ("HCI"), and a REMon component that operates below the HCI, together with baseband components of the Bluetooth protocol. The REMan component receives information regarding existing links and neighboring BSUs, and evaluates performance indicators of each link. The REMon component performs link quality measurements for REMan. BSU neighbor discovery under the routine 700 is performed with the REMan component, within the radio environment monitoring and management software, and above the HCI.

With the exception of block 702, the routine 700 may be performed periodically by each individual BSU on its own initiative. The time intervals, and any other conditions that prompt neighbor discovery to be performed under the routine 700, can be system administrator configurable and based on a time interval dependent upon particular considerations within a PMN.

In a first alternative embodiment, the system controller 208 initiates periodic neighbor discovery by issuing appropriate periodic commands to the BSUs of the PMN, which performs the routine 700 (except block 702) in response.

In a second alternative embodiment, each BSU sends periodic heartbeat messages directly to each. BSU that considers them a neighbor. The periodic heartbeat messages may be transmitted between neighboring BSUs either wirelessly or via wired connections. Unlike the prior alternative embodiment, this embodiment does not depend on the system controller 208. After performing blocks 702-712 (FIG. 7), each BSU sends a "you're my neighbor" message to each BSU in its neighbor list, and also starts maintaining a timer for each neighbor. It then starts expecting heartbeat messages from each of its neighbors on a regular basis. When a neighbor's heartbeat messages become absent long enough for the timer to have expired, then that BSU can be deemed down and may be removed by the BSU from its neighbor list. For example, referring to FIG. 8: when BSU B6 misses one or more messages from neighbor BSU B11, B6 can assume B11 is having trouble. BSU B6 can remove BSU B11 from B6's neighbor list and will no longer hand off to B11.

Figure 10:
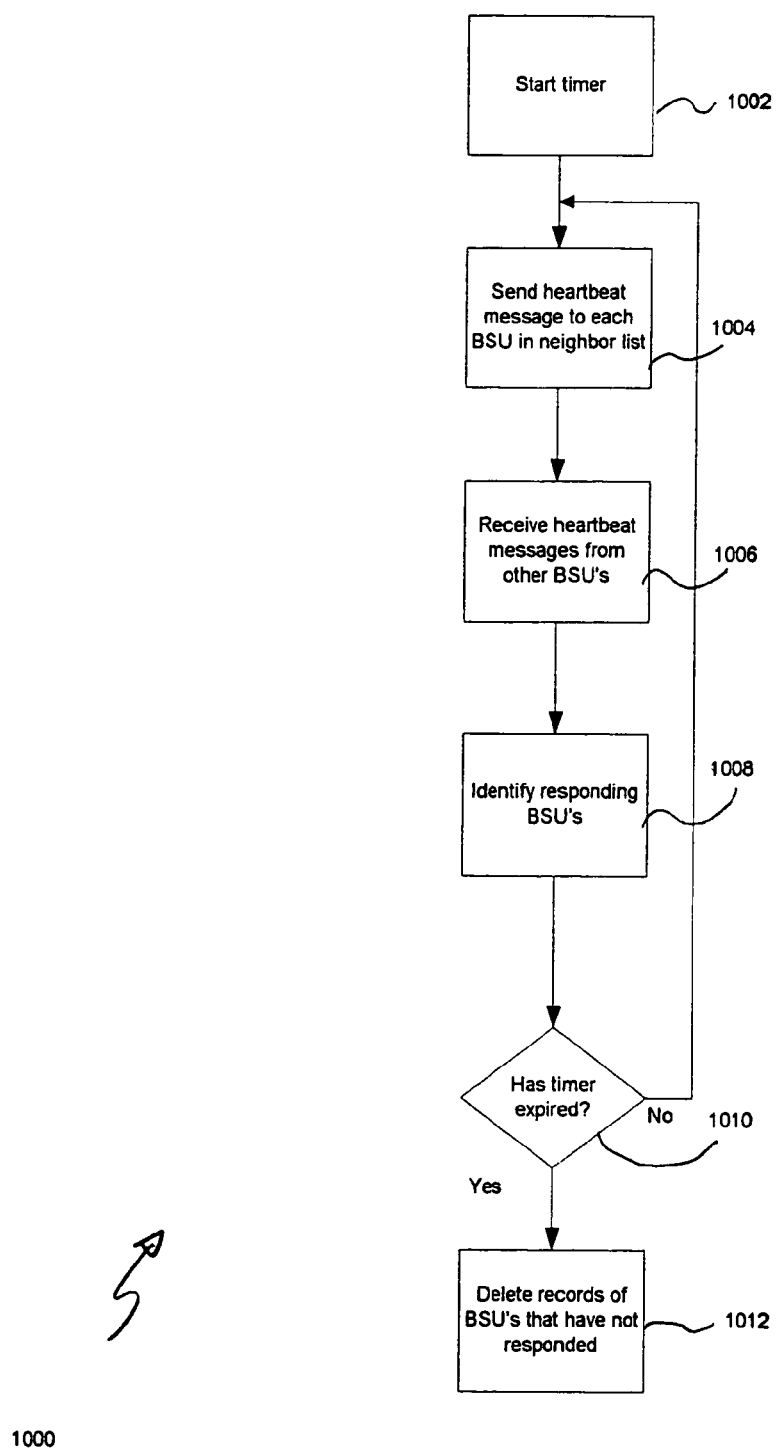
FIG. 10 is a flow diagram illustrating an alternative method to that of FIG. 7 for identifying changes in updating neighbor list records.

Referring to FIG. 10, a routine 1000 is shown for implementing this second alternative embodiment in each BSU. In block 1002, the BSU starts a timer. In block 1004, a given BSU retrieves its neighbor list and begins to send a periodic heartbeat message to each BSU in the list. The heartbeat message includes, among other information, data identifying that particular BSU. In block 1006, the BSU begins receiving heartbeat messages from other BSUs. In block 1008, the BSU identifies each responding BSU based on the BSU identifying information in each received heartbeat message. In block 1010, the BSU determines whether the timer has expired. If not, then the routine loops back to again perform the functions under blocks 1004, 1006, 1008 and 1010. If the timer has expired, then in block 1012, the BSU deletes records of BSUs that have not responded, or otherwise modifies the neighbor list to indicate BSUs that are inoperative. The routine 1000 can be performed periodically by all BSUs in the PMN, and may be tied to the system clock. Alternatively, the system controller may issue a command to all BSUs in the PMN to perform the routine 1000.

A disadvantage of this alternative is that it does not handle integration of a new BSU into the network. To avoid this disadvantage, each new BSU issues a command message to initiate neighbor discovery to again require the BSUs to perform the functions under blocks 704-712.

In a third alternative embodiment (that combines elements of the previous embodiments), each BSU sends periodic heartbeat messages to the system controller regardless of whether it has been discovered. If a BSU's heartbeat messages become absent for some period of time, or if heartbeats from a new BSU become apparent to the system controller, then the system controller 208 can command neighbor discovery and request each BSU to perform the functions under blocks 704-712.

In a fourth alternative embodiment, after the initial discovery under blocks 702-712, each BSU notifies the system controller 208 of who its discovered neighbors are. Each BSU also begins a periodic heartbeat message to the system controller over the backend network (which can be wired or wireless). If a BSU fails, the system controller will recognize this within one heartbeat period and will notify that BSU's neighbors that they should remove or otherwise flag the downed BSU from their neighbor lists. To accommodate new BSUs, each newly-added BSU issues a command to again initiate neighbor discovery, as noted above with respect to the third alternative embodiment.

While aspects of the invention are generally described above as employing multiple radio transmission power levels, an alternative embodiment may employ only one class of radio transmission power. Thus, each BSU generates a single tier of neighbors, which is stored locally and used for handoffs.

Alternatively, each BSU may employ power level measurement circuitry to measure the signal strength of signals received from other BSUs. As a result, each BSU can further segregate BSUs or devices within a given tier to determine approximate distances from it.

Another alternative embodiment employs Heuristic learning by utilizing MUs that happen to be roaming through the network. BSUs note which MUs they host and at which times. BSUs then exchange messages or "compare notes" with other BSUs. Analysis of the times at which a particular MU was present in which BSU's domain determine the sequence of BSUs traversed by that MU. That sequence, in turn, would reveal a series of neighbor pairs.

For example, referring to FIG. 9, an MU moved among and was hosted by these BSUs in this order over a predetermined analysis time period: B11, B14, B18, B19, B23. This implies the following BSU neighbor relationships: B11-B14, B14-B18, B18-B19, B19-B23.

Figure 11:
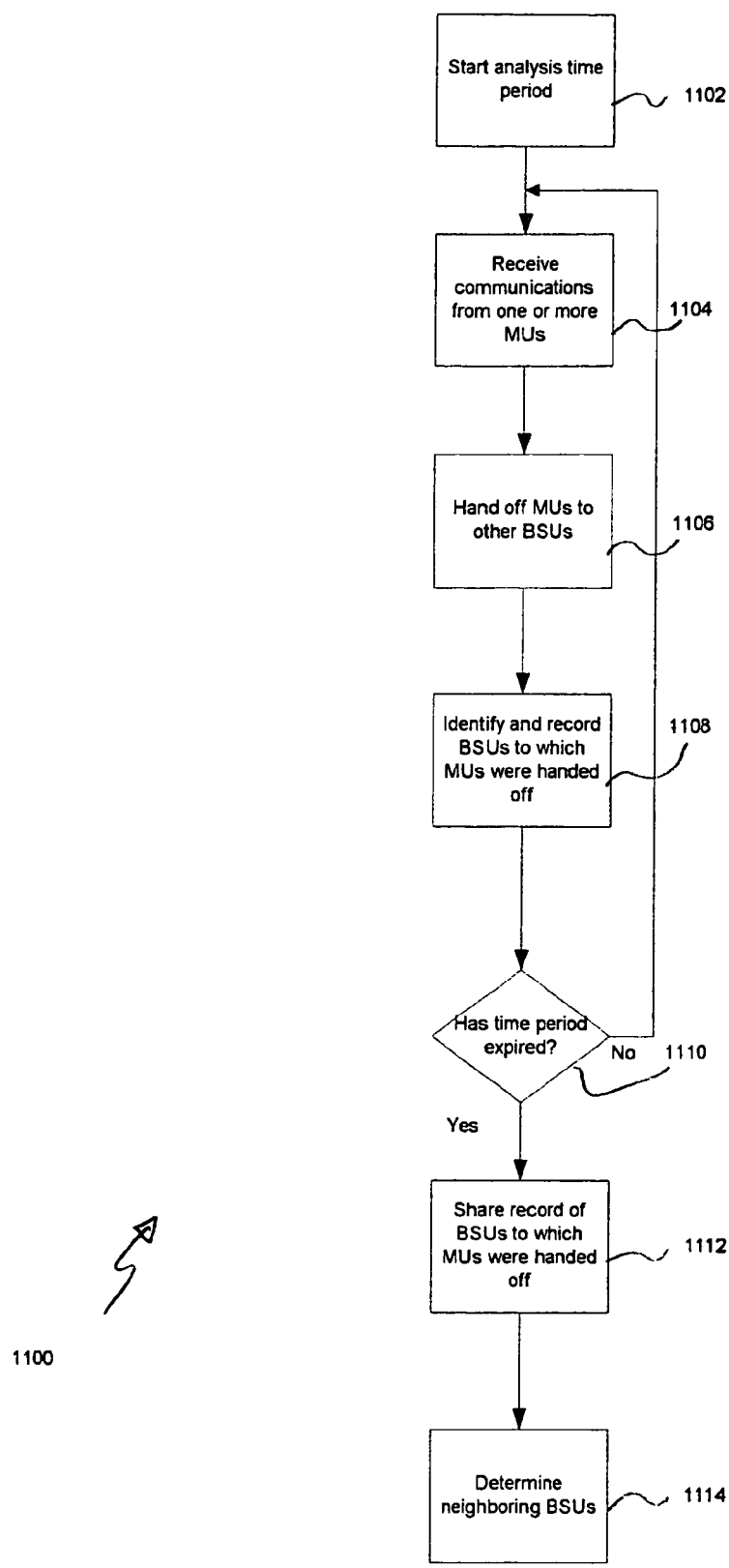
FIG. 11 is a flow diagram illustrating an alternative neighbor discovery method to that of FIG. 7.

Referring to FIG. 11, a routine 1100 is shown that may be performed by each BSU under this alternative method to heuristically identify neighboring BSUs. Beginning in block 1102, a given BSU starts an analysis time period. In block 1104, the BSU receives communications from one or more mobile units. In block 1106, the BSU hands off the mobile units to other BSUs. Not having identified neighbors, the BSU must query all BSUs in the whole PMN to determine which BSUs may have received a given mobile unit handoff. In block 1108, the BSU identifies and records those BSUs to which mobile units were handed off.

In block 1110, the BSU determines whether the analysis time period has expired. If not, the routine loops back to again perform the functions under blocks 1104 through 1110. After the time period has expired, the BSU under block 1112 shares its record of BSUs to which mobile units were handed off, and receives records from other BSUs. In block 1114, the BSU then determines which BSUs are neighbors and creates or updates its locally stored neighbor list. Under an alternative embodiment, if the BSU has sufficiently identified those BSUs to which it may hand off a mobile unit under block 1108, the BSU need not perform the functions under blocks 1112 and 1114.

Given enough MUs roaming through the network in enough different directions, the BSU topology can, over time, be deduced from the overlapping sets of BSU neighbor relationships. Alternatively, instead of BSUs comparing notes with other BSUs, the BSUs instead send their discoveries to the system controller, which in turn analyzes the data to deduce the BSU topology.

Referring to FIG. 12, an example of a neighbor list record is shown as record 1200. In this embodiment, a separate record is stored and maintained at each BSU, where each record is associated with one neighbor of that BSU. A neighbor's Bluetooth device address ("BD_ADDR") 1202 corresponds to a unique 48 bit address specified under the Bluetooth protocol. The BD_ADDR uniquely identifies each Bluetooth device universally and thus, uniquely identifies the particular neighbor associated with the record. A neighbor relationship field 1204 identifies the "class" of neighbor with respect to the given BSU maintaining the record 1200. For example, the neighbor may exist within the first, second or third tiers noted above.

An initialization time field 1206 identifies the date and time that the neighbor was first detected. A rediscovery time field 1208 corresponds to the date and time that the neighbor was detected during the most recent periodic neighbor rediscovery. A neighbor's synchronization master field 1210 corresponds to a predetermined BD_ADDR to which the neighbor synchronizes its clock. Wireless BSU synchronization and use of a sync master address are described in further detail in U.S. patent application No. 60/288,294, entitled "Wireless System BSU to BSU Synchronization". A record expiration field 1212 identifies when this record will expire and need refreshing, as noted above.

Embodiments of the invention improve network management in at least the following areas. Network installation becomes, for example:

Simpler—personnel time expended during BSU installation is reduced since installers do not have to custom-configure each BSU with knowledge of any neighbors More robust—personnel error in identifying BSU neighbors and configuration during installation is eliminated Less costly—installation personnel do not need to possess as high a skill level as they would if they had to configure each BSU.

Network operation improves because network operation automatically adjusts to changes to the network and/or radio environment. Periodic neighbor rediscovery handles exceptional situations (such as a BSU going down or coming online) that result in changes to one or more BSU's list of neighbors. The system detects and accommodates these changes and operator intervention is not required, enhancing overall system robustness. Further, the system performs such functions at a peer-to-peer level, in many cases without MU or system controller involvement.

While BSUs are generally described herein, aspects of the invention may employ any "Bluetooth switch." Such a switch may have less functionality and be cheaper to implement than a BSU.

Those skilled in the relevant art will appreciate that the invention can be practiced with various telecommunications or computer system configurations, including Internet appliances, hand-held devices, wearable computers, palm-top computers, cellular or mobile phones, multi-processor systems, microprocessor-based or programmable consumer electronics, set-top boxes, network PCs, mini-computers, mainframe computers, and the like. Aspects of the invention can be embodied in a special purpose computer or data processor that is specifically programmed, configured, or constructed to perform one or more of the computer-executable instructions explained in detail herein. Indeed, the term "computer", as used generally herein, refers to any of the above devices, as well as to any data processor. Data structures and transmission of data particular to aspects of the invention are also encompassed within the scope of the invention. In general, while hardware platforms such as stationary and mobile devices are described herein, aspects of the invention are equally applicable to nodes on the network having corresponding resource locators to identify such nodes.

Incorporated by reference herein are all above references, patents, or applications and the following U.S. provisional applications, which are assigned to the assignee of this application: application No. 60/262,558, entitled Link Context Mobility, Such as for use in Wireless Networks, filed Jan. 18, 2001; application No. 60/288,294, entitled Wireless System Base Station to Base Station Synchronization; application No. 60/288,270, entitled Method for Load Balancing Wireless Networks; application No. 60/288,301, entitled Frequency-Hopping Spread Spectrum Wireless Systems Interface Migration by Transmit Suppression; and application No. 60/288,300, entitled Visual Base Station to Wireless Link Quality Indicator.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above", "below," and words of similar import, when used in this application, shall refer to this application as a whole and not to any particular portions of this application.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not necessarily the PMN system described herein. The various embodiments described herein can be combined to provide further embodiments. These and other changes can be made to the invention in light of the detailed description.

All of the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A system for wirelessly exchanging communications with at least one mobile unit, the system comprising:
   a first base station unit coupled to a network;
   a second base station unit coupled to the network, wherein the first and second base station units are configured to communicate wirelessly with the mobile unit under a Bluetooth protocol and to automatically handoff the mobile unit from the first base station unit to the second base station unit;
   wherein the first and second base station units are configured to:
      use a low power class capability to inquire whether Bluetooth compatible devices are within a near communications range;
      use a medium power class capability to inquire whether Bluetooth compatible devices are within an intermediate communications range;
      use a high power class capability to inquire whether Bluetooth compatible devices are within a far communications range;
      store at least one record that identifies any Bluetooth compatible devices are within the near, intermediate and far communications ranges;
      identify which devices are base station units capable of accepting the mobile unit during a handoff, wherein identification of base station units results from a wireless inquiry signal from the identifying base station and a wireless response signal back from the identified base stations; and
      update the at least one record to reflect changes in base station units capable of accepting the mobile unit during a handoff.

2. The system of claim 1, further comprising a system controller coupled to the first and second base station units and to the network, wherein the system controller is configured to mediate communications between the first and second base stations and the network,
   wherein the low, medium and high power classes include 0 dB, 4 dB and 20 dB power classes, respectively,
   wherein identifying which devices are base station units capable of accepting the mobile unit during a handoff includes employing a Bluetooth service discovery protocol to identify services associated with identified devices; and
   wherein updating the at least one record includes again using the low, medium and high power class capabilities to inquire whether Bluetooth compatible devices are within the near, intermediate and far communications ranges, and updating the at least one record when a rediscovery period has expired.

3. The system of claim 1 wherein updating the at least one record includes:
   sending periodic signals to neighboring base station units, wherein the periodic signals include information identifying the base station unit that sends the periodic signals;
   receiving periodic signals from at least one neighboring base station unit;
   determining an identity of the one neighboring base station unit based on the received periodic signals; and
   updating the at least one record if a periodic signal is not received from a previously neighboring base station.

4. A method of creating a list of neighboring base station units in a wireless communications network, wherein at least one mobile unit communicates with at least a portion of the network, the method of creating the list of neighboring base station units comprising:
   at a stationary base station unit in the communications network, wirelessly sending at least one inquiry signal to neighboring wireless devices, using a low power class capability and a high power class capability to inquire whether wireless devices are within a near communications range and a far communications range, respectively;
   at the stationary base station unit in the communications network, wirelessly receiving at least one response signal from at least one neighboring base station unit in the communications network, wherein the one neighboring base station unit is stationary;
   at the stationary base station unit in the communications network, identifying the one neighboring base station unit based in part on the received response signal, wherein identifying the at least one neighboring base station unit is done without involvement of me mobile unit and without Involvement of a system controller for the communications network; and
   at the stationary base station unit in me communications network, providing a stored neighbor list that identifies the one neighboring base station unit in the communications network;
   wherein the base station unit and the neighboring base station unit are both Bluetooth enabled base station units;
   wherein sending at least one inquiry signal includes wirelessly sending a Bluetooth inquiry signal with respect to at least two different power classes; wherein identifying the one neighboring base station unit includes employing a Bluetooth service discovery protocol to identify two or more neighboring base station units; and
   wherein providing a stored neighbor list includes locally storing a list categorizing the identified neighboring base station units Into at least two different categories based on the two different power classes.

5. The method of claim 4 wherein sending at least one inquiry signal and receiving a response signal includes wirelessly exchanging signals under a Bluetooth protocol.

6. The method of claim 4 wherein identifying the one neighboring base station unit includes employing a Bluetooth service discovery protocol.

7. The method of claim 4 wherein providing a stored neighbor list includes locally storing a list categorizing identified neighboring base station units into at least two different categories.

8. The method of claim 4, further comprising automatically updating the stored neighbor list to reflect changes in neighboring base station units, and wherein sending at least one inquiry signal and receiving a response signal is performed wirelessly between the base station unit and the neighboring base station unit.

9. The method of claim 4, further comprising updating the stored neighbor list to reflect changes in neighboring base station units by again sending at least one inquiry signal and receiving a response signal, and updating the stored neighbor list, when a predetermined time period has expired.

10. The method of 4, further comprising updating the stored neighbor list to reflect changes in the one neighboring base station unit, wherein updating the stored neighbor list comprises:

wirelessly sending periodic signals to neighboring base station units, wherein the periodic signals include information identifying the base station unit;

wirelessly receiving periodic signals from the one neighboring base station unit and another neighboring base station unit;

determining an identity of the another neighboring base station unit based on the received periodic signals; and updating the stored neighbor list based on the received signal from the another neighboring base station.

11. The method of claim 4, further comprising receiving periodic signals from the one neighboring base station unit, and updating the stored neighbor list if a periodic signal is not received from the one neighboring base station.

12. The method of claim 4, further comprising determining whether a certain time period associated with at least a portion of the stored neighbor list has expired, and if so, then again sending at least one inquiry signal, receiving a response signal, and updating the stored neighbor list.

13. The method of claim 4, further comprising providing periodic signals to a system controller, and updating the stored neighbor list based on a command signal received from the system controller.

14. The method of claim 4, further comprising determining whether a certain time period has expired, and if so, then again sending at least one inquiry signal, receiving a response signal, and updating the stored neighbor list.

15. The method of claim 4, further comprising receiving a command signal from a system controller coupled to the base station unit, and in response thereto, again sending at least one inquiry signal, receiving a response signal, and updating the stored neighbor list.

16. The method of claim 4 wherein the stationary base station unit is stationary relative to a moving vehicle.

17. The method of claim 4 wherein providing a stored neighbor list includes locally storing a list categorizing the identified neighboring base station units into at least one category.

18. A computer-readable storage medium encoded with a computer program whose contents cause a fixed short-range wireless communications switch to perform a peer-to-peer method to provide a neighbor list for neighboring and fixed short-range wireless communications switches in a communications network, wherein at least one mobile unit communicates with at least a portion of the communications network, the method comprising:

at the fixed short-range wireless switch in the communications network, sending at least one signal to neighboring wireless devices, wherein sending the signal is done without assistance of the mobile unit and without the assistance of a system controller for the communications network, using a low power class capability and a high power class capability to inquire whether wireless devices are within a near communications range and a far communications range, respectively;

at the fixed short-range wireless switch in the communications network, receiving a response signal from at least one fixed neighboring short-range wireless switch;

at the fixed short-range wireless switch in the communications network, identifying the one neighboring short-range wireless switch based on the received response signal, wherein identifying the one fixed neighboring short-range wireless switch results from direct and wireless communication between the fixed short-range wireless switch and the one fixed neighboring short-range wireless switch without assistance of the mobile unit or system controller; and providing a neighbor list that identifies the one neighboring short-range wireless switch.

19. The computer-readable storage medium of claim 18 wherein the computer-readable medium is a computer-readable disk.

20. The computer-readable storage medium of claim 18 wherein the computer-readable medium is a memory of a computer system.

21. In a short-range wireless communications network, wherein at least one mobile unit communicates with at least a portion of the network, an apparatus comprising:

fixed means for providing short-range wireless communications within the communications network, wherein the means for providing short-range wireless communications comprises:

means for wirelessly sending at least one signal to neighboring wireless devices using a low power class capability and a high power class capability to inquire whether wireless devices are within a near communications range and a far communications range, respectively, wherein sending the signal is done without assistance of the mobile unit and without the assistance of a system controller for the communications network;

means for wirelessly receiving a response signal from at least one neighboring short-range wireless network node;

means, coupled to the means for receiving, for identifying the one neighboring short-range wireless network node based on the received response signal, wherein identifying the one neighboring short-range network node is done without assistance of the mobile unit or system controller, and wherein the neighboring short-range network node is fixed; and means for providing a neighbor list that identifies the one neighboring short-range network node.

22. The apparatus of claim 21 wherein the means for sending at least one inquiry signal and the means for receiving a response signal include wirelessly exchanging signals under a Bluetooth protocol.

23. The apparatus of claim 21 wherein the means for providing further comprises means for locally storing a list categorizing identified neighboring short-range network nodes into at least two different categories.

24. The apparatus of claim 21 wherein the fixed means for providing short-range wireless communications provides wireless communications under a standard protocol for a range up to about 500 meters.

\* \* \* \* \*